(12) United States Patent
Turner

(10) Patent No.: US 10,231,431 B1
(45) Date of Patent: Mar. 19, 2019

(54) SELF-CLEANING LITTER BOX

(71) Applicant: Bruce Keith Turner, Mount Pleasant, TN (US)

(72) Inventor: Bruce Keith Turner, Mount Pleasant, TN (US)

( * ) Notice: Subject to any disclaimer, the term of this patent is extended or adjusted under 35 U.S.C. 154(b) by 0 days.

(21) Appl. No.: 16/113,461

(22) Filed: Aug. 27, 2018

Related U.S. Application Data

(60) Provisional application No. 62/574,751, filed on Oct. 20, 2017.

(51) Int. Cl.
*A01K 1/01* (2006.01)

(52) U.S. Cl.
CPC ............ *A01K 1/011* (2013.01); *A01K 1/0114* (2013.01)

(58) Field of Classification Search
USPC .................................................. 119/166, 165
See application file for complete search history.

(56) References Cited

U.S. PATENT DOCUMENTS

| | | | | |
|---|---|---|---|---|
| 5,048,464 A * | 9/1991 | Shirley | ................. | A01K 1/0114 119/166 |
| 5,107,797 A * | 4/1992 | LaRoche | .............. | A01K 1/0114 119/163 |
| 5,259,340 A | 11/1993 | Arbogast | | |
| 5,267,530 A | 12/1993 | Zamoyski | | |
| 5,507,252 A * | 4/1996 | Ebert | .................... | A01K 1/0114 119/166 |
| 5,662,066 A * | 9/1997 | Reitz | ..................... | A01K 1/0114 119/163 |
| 5,752,465 A * | 5/1998 | Page | ..................... | A01K 1/0114 119/166 |
| 7,013,835 B2 | 3/2006 | Brokaski | | |
| 8,413,608 B2 * | 4/2013 | Sharp | ..................... | A01K 1/011 119/166 |
| 8,683,952 B2 | 4/2014 | Miller | | |
| 2007/0227457 A1 * | 10/2007 | Waters | ................. | A01K 1/0114 119/166 |
| 2008/0017123 A1 * | 1/2008 | Chin | ....................... | A01K 1/011 119/166 |
| 2011/0155070 A1 | 6/2011 | Cook et al. | | |
| 2013/0019810 A1 * | 1/2013 | Romano | ............... | A01K 1/0114 119/167 |
| 2013/0276714 A1 * | 10/2013 | Bauer | .................. | A01K 1/0107 119/166 |
| 2013/0333625 A1 * | 12/2013 | Baxter | ................. | A01K 1/0114 119/166 |

\* cited by examiner

*Primary Examiner* — Yvonne R Abbott-Lewis
(74) *Attorney, Agent, or Firm* — Global Intellectual Property Agency, LLC; Daniel Boudwin

(57) ABSTRACT

A self-cleaning litter box configured to sift excrement from cat litter. The self-cleaning litter box includes a drum designed to rotate about an axis, having a hollow center with an interior volume designed to hold cat litter, with a pair of annular sides opposite one another coupled by a circumferential sidewall. An aperture disposed in the circumferential sidewall designed to provide access to the interior volume. A filter screen disposed within the interior volume and extending across the drum is designed to sift excrement from cat litter. The drum is disposed within a base such that each annular side is flush against the base. A waste container is positioned within the base. The waste container includes an opening in communication with the drum such that the aperture of the drum is configured to fit flush against the opening of the waste container when the drum is rotated for sifting excrement.

7 Claims, 4 Drawing Sheets

SELF-CLEANING LITTER BOX

CROSS REFERENCE TO RELATED APPLICATIONS

This application claims the benefit of U.S. Provisional Application No. 62/574,751 filed on Oct. 20, 2017. The above identified patent application is herein incorporated by reference in its entirety to provide continuity of disclosure.

BACKGROUND OF THE INVENTION

The present invention relates to a self-cleaning litter box. More specifically, the present invention provides a self-cleaning litter box including a rotating drum configured to hold cat litter therein and having an aperture along the sidewall to allow access to the interior of the drum. The drum is disposed in a base configured to support the drum having a waste container with an opening therein disposed in the base.

Cats are one of the most popular choices for pet owners. However, most cats use a litter box which must be maintained daily. Additionally, one litter box is typically not sufficient for pet owners who own more than one cat. At most pet stores that house cats, litter boxes are cleaned several times a day. Although self-cleaning litter boxes can be purchased by cat owners, typical self-cleaning litter boxes have a tendency to scare the cat resulting in decreased usage. Therefore, there is a need for an improved self-cleaning litter box.

SUMMARY OF THE INVENTION

In view of the foregoing disadvantages inherent in the known types of litter boxes now present in the known art, the present invention provides a self-cleaning litter box wherein the same can be utilized for providing convenience for the user when desiring to easily clean the litter box by separating the cat excrement from the litter.

The present system comprises a drum configured to rotate about an axis, having a hollow center defining an interior volume configured to hold cat litter with a pair of annular sides disposed opposite one another coupled by a circumferential sidewall. An aperture is disposed in the circumferential sidewall configured to provide access to the interior volume. A filter screen is disposed within the interior volume extending across the drum and configured to sift cat excrement from cat litter. The drum is disposed within a base such that each annular side is flush within the base. A waste container is disposed within the base having an opening in communication with the drum such that the aperture is configured to fit flush against the opening when the drum is rotated. In this way, a user is able to easily dispose of cat excrement.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
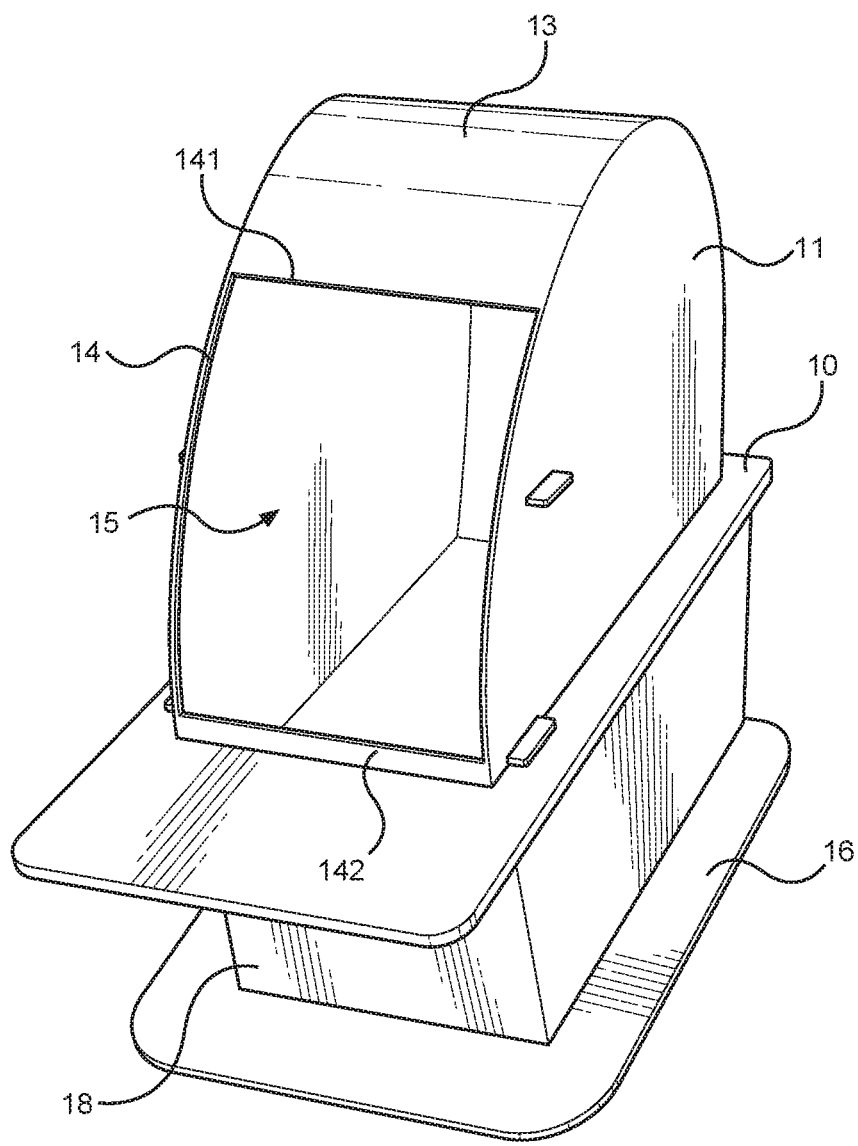
FIG. 1 shows a perspective view of an embodiment of the self-cleaning litter box.

Reference is made herein to the attached drawings. Like reference numerals are used throughout the drawings to depict like or similar elements of the multi-pronged tool. The figures are intended for representative purposes only and should not be considered to be limiting in any respect.

Figure 2:
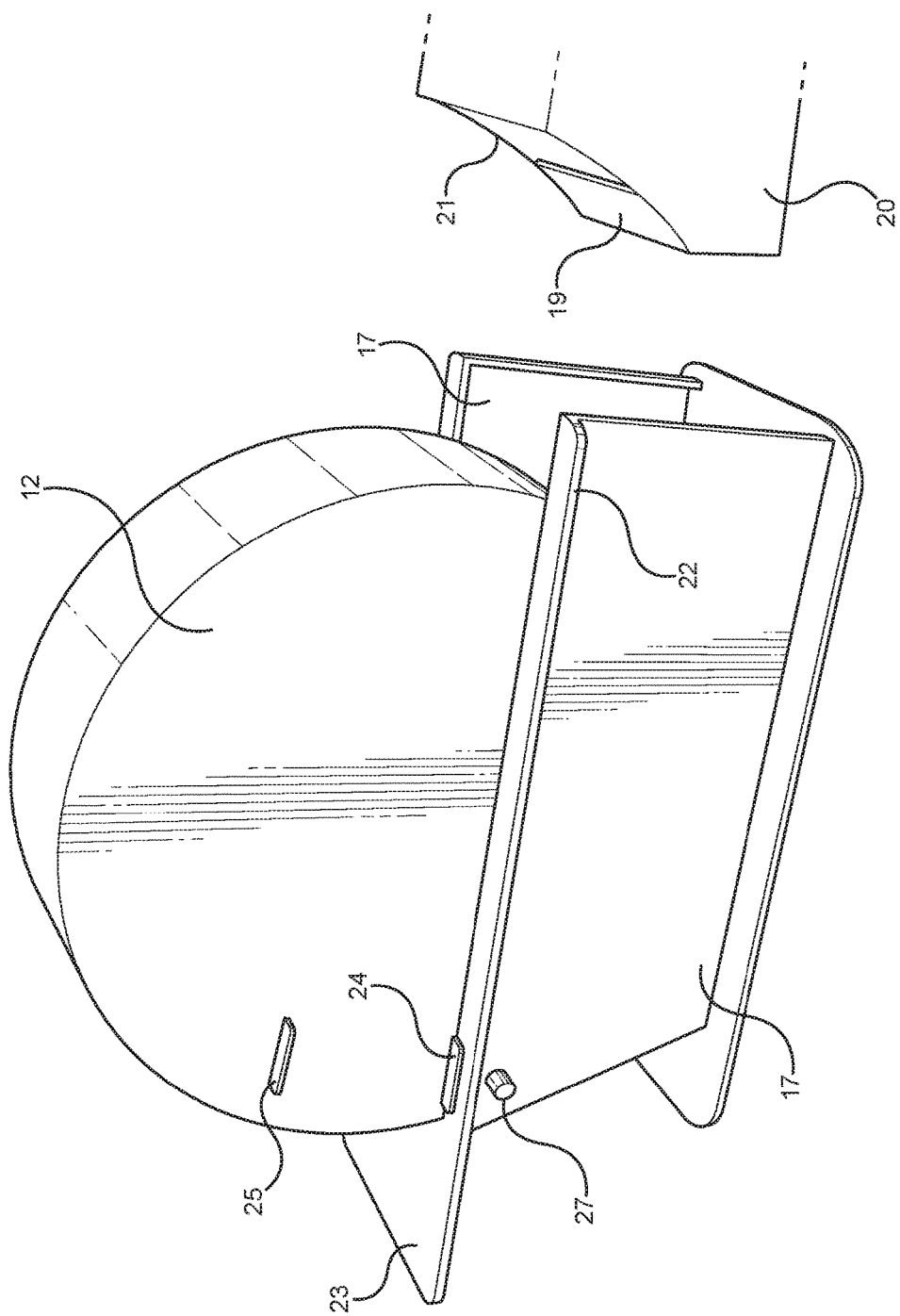
FIG. 2 shows a perspective view of an embodiment of the self-cleaning litter box with the waste container detached.

Referring now to FIG. 1 and FIG. 2, there is shown a perspective view of an embodiment of the self-cleaning litter box and a perspective view of an embodiment of the self-cleaning litter box with the waste container detached, respectively. A self-cleaning litter box 10 comprises a drum 11, configured to rotate clockwise about an axis. The drum 11 has a hollow center comprising an interior volume 15 configured to hold cat litter within. The drum 11 is defined by a pair of annularly shaped sides 12 disposed opposite one another. In the illustrated embodiment, both annularly shaped sides 12 are equivalent in diameter to one another. The two annularly shaped sides 12 are coupled together via a circumferential sidewall 13 extending therebetween along the circumference of each annular side 12. In the illustrated embodiment, the interior volume 15 is coated with a non-stick material such that the cat litter can slide easily around the interior volume 15 of the drum 11 when the drum 11 is rotated.

An aperture 14, having a first end 141 and a second end 142, is disposed along the circumferential sidewall 13 and configured to provide access to the interior volume 15. As such, the aperture 14 is sized to allow a cat to pass easily through it. In the illustrated embodiment, the distance between the first end 141 and the second end 142 of the aperture 14 is an art-length of at least forty-five degrees of the circumferential sidewall 13, however in other embodiments the aperture 14 comprises a portion of the circumferential wall 13 greater than an arc-length of forty-five degrees.

The drum 11 is disposed in a base 16 having a pair of sidewalls 17 as well as a front wall 18 and a back wall 19 configured to support the drum. The drum 11 is disposed such that each annularly shaped side 12 is flush against the interior sides of the sidewalls 17 of the base 16. In the shown embodiment, the sidewalls 17 of the base 16 are configured to enclose at least half of the drum 11 so as to provide ample stability for the drum 11 when rotating within the base 16. The front wall 18 and back wall 19 are each slanted and extend outwardly from the base 16 to partially enclose the front and rear portions of the circumferential perimeter 13 of the drum 11, respectively.

A waste receptacle 20 is disposed along the rear wall 19 of the base 16 and includes an opening 21 configured to accept cat excrement therein when the drum 11 is rotated appropriately. In the illustrated embodiment, the waste receptacle 20 is removably secured within the base 16 wherein the waste receptacle 20 makes up a portion of the rear wall 19, such that the rear wall 19 is removably securable to the base 16. In the illustrated embodiment, the opening 21 is sized to extend across the rear wall 19 such that the opening 21 encompasses a part of the rear wall 19.

A protrusion 23 is disposed on the front wall 18 of the base 16 extending outwardly from the base 16 and drum 11. The protrusion 23 is configured to support an animal, such as a cat, thereupon, and is thus sized and strengthened appropriately to sustain the cat. The protrusion 23 is configured to align flush with the second end 142 of the aperture 14, such that the cat can enter and use the interior volume 15 of the drum 11 by jumping up to the protrusion 23.

In the illustrated embodiment, a flat handle 24 is disposed on an outer surface of each annular side 12, thereby allowing a user to manually rotate the drum 11 by lifting the flat handles 24 upward. In the illustrated embodiment, the flat handle 24 is disposed such that it is aligned with the second end 142 of the aperture 14. In one embodiment, a portion of the protrusion 23 extends to the sidewalls 17 of the base 16. In this way, a flange 22 is formed, wherein the flange 22 is flush against each annular side 12 of the drum 11 and extending outward from the sidewalls 17 of the base 16. In the illustrated embodiment, the pair of flat handles 24 rest atop the flange 22, such that the flange 22 is configured to prevent the drum 11 from rotating counter-clockwise.

In one embodiment, a knob 27 is disposed on one of the sidewalls 17 of the base 16. The knob 27 extends through the sidewall 17 to act as a locking mechanism for the drum 11, wherein the user can pull the knob 27 away from the drum 11, thereby selectively unlocking the rotational ability of the drum 11. In this way, the knob 27 can prevent the drum 11 from accidentally rotating clockwise while the cat is moving within the drum 11.

In another embodiment, a pair of additional handles 25 are also disposed on each annular side 12 of the drum 11. In the illustrated embodiment, the additional handles 25 are disposed halfway up the side of the aperture 14. The additional handles 25 prevent the drum 11 from over-rotating when the handles 25 contact the flange 22, thereby preventing any cat litter that might spill out of the aperture 14.

Figure 3A:
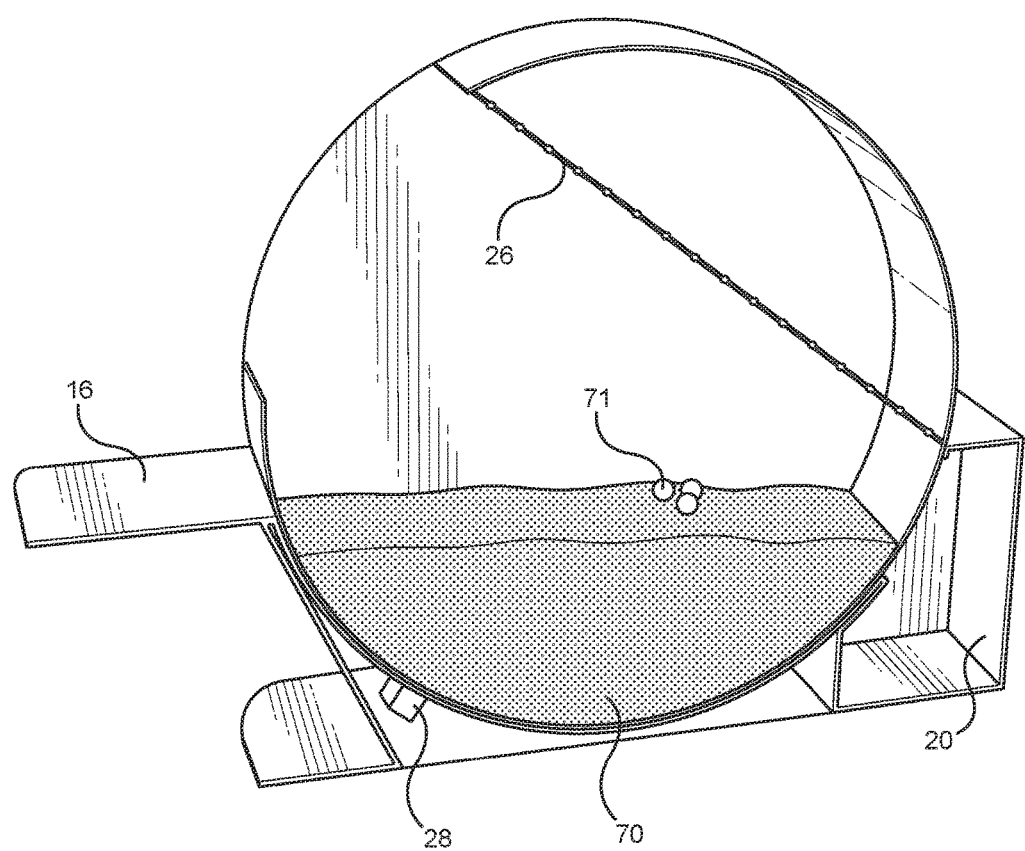
FIG. 3A shows a cross-section view of an embodiment of the self-cleaning litter box in use.
Figure 3B:
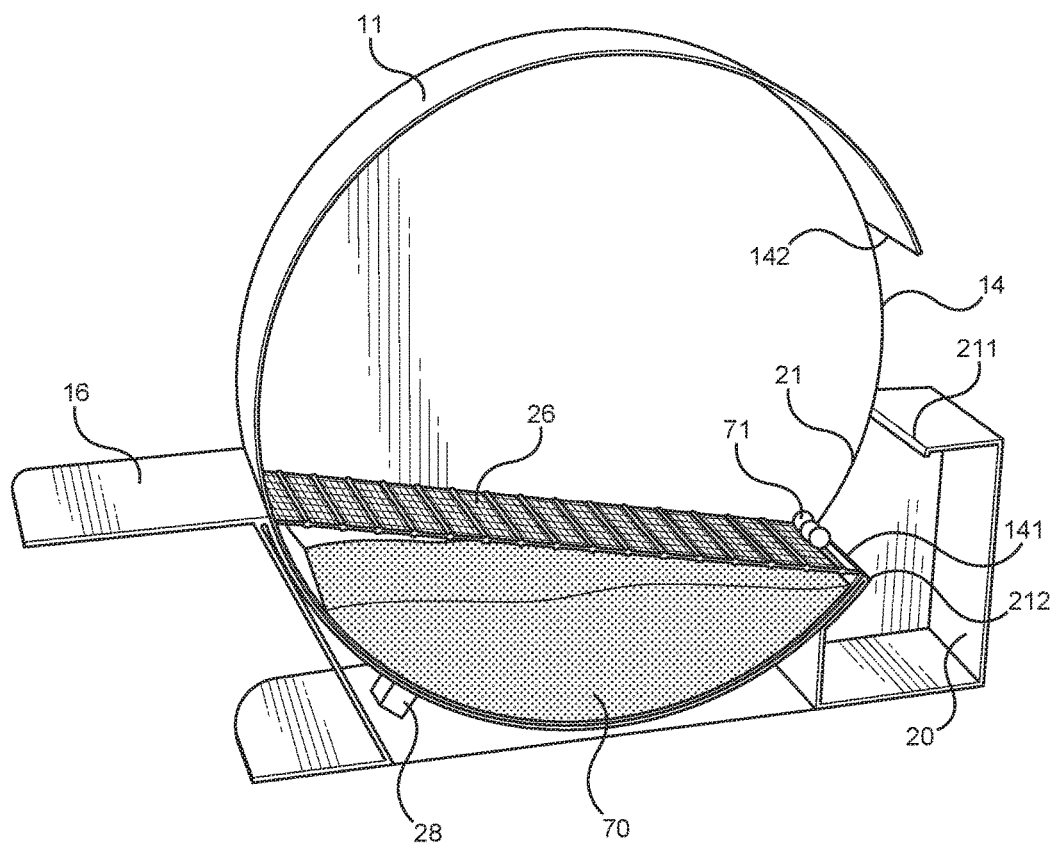
FIG. 3B shows another cross-section view of an embodiment of the self-cleaning litter box rotated and in use.

Regarding FIGS. 3A and 3B, there are shown cross-section views of an embodiment of the self-cleaning litter box in use. A filter screen 26 configured to sift cat excrement 71 from cat litter 70 is disposed within the interior volume of the drum 11. The filter screen 26 extends across a portion of the drum 11 such that it reaches from one point on the circumferential sidewall to an opposing point. In the illustrated embodiment, the filter screen 26 is permanently affixed at the first end 141 of the aperture 14, such that when the drum 11 has not been rotated and the protrusion on the base 16 is aligned with the second end 142 of the aperture 14, the filter screen 26 is disposed at the top of the drum 11.

As the drum 11 is rotated, the litter 70 and excrement 71 move along the circumferential sidewall of the drum 11, such that the litter 70 and excrement 71 are always at the lowest point of the drum 11 as the drum 11 rotates. The filter screen 26 is configured to sift through the litter 70 as the drum 11 is rotated, such that the excrement 71 is separated from the litter 70 and disposed atop the filter screen 26 with the litter 70 beneath the filter screen 26. The opening 21 on the waste receptacle 20 has a top edge 211 and a bottom edge 212. The bottom edge 212 of the waste receptacle 20 is configured to align with the first end 141 of the aperture 14 on the drum 11 when the drum 11 is fully rotated. Once the drum 11 is rotated, the filter screen 26 is tilted such that the cat excrement 71 atop the filter screen 26 will roll off the filter screen 26 into the waste receptacle 20 through the opening 21. In the illustrated embodiment, the additional handles are configured to prevent the drum 11 from over-rotating and spilling the litter 70 out of the aperture 14. Thus, the distance between the additional handles and the first end 141 of the aperture 14 is configured to be equivalent to a length of the opening 21 of the waste receptacle 20, such that the additional handles are always aligned with the top edge 211 of the waste receptacle 20 and the first end 141 of the aperture 14 is always aligned with the bottom edge 212 of the waste receptacle 20, when the drum 11 is fully rotated.

In one embodiment, a motor 28 is disposed within the base 16. The motor 28 is operably connected to the drum 11 and configured to automatically rotate the drum 11. In the illustrated embodiment, the motor 28 is configured to rotate the drum 11 once an animal has exited the interior volume of the drum 11. In this way, a user can rely on the self-cleaning litter box to keep clean even when the user is not around to manually rotate and empty the drum 11.

In operation, the drum 11 is placed in the base 16 such that the filter screen 26 is at the top of the drum 11 and the lower end of the aperture 14 is aligned with the protrusion of the base 16. Cat litter 70 is disposed in the bottom of the drum 11. After a cat has used the litter 70 disposed within the drum 11, a user can rotate the drum 11 such that the filter screen 26 separates the excrement 71 from the litter 70. As the drum 11 is rotated, the excrement 71 atop the filter screen 26 is knocked into a waste receptacle 20 affixed to the back end of the base 16. In another embodiment, the drum 11 automatically rotates through the use of a motor 28 once the cat has exited the litter box.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-cleaning litter box, comprising:
   a drum configured to rotate about an axis, the drum having a hollow center comprising an interior volume configured to hold cat litter, wherein the interior volume is defined by a pair of annularly shaped sides disposed opposite one another and coupled via a circumferential sidewall;
   an aperture disposed in the circumferential sidewall configured to provide access to the interior volume;
   a filter screen configured to sift cat excrement from cat litter disposed within the interior volume, the filter screen extending across a diameter of the drum from the aperture to an opposing portion of the circumferential sidewall;
   a base configured to support the drum such that each annularly shaped side is flush within the base;
   a waste container disposed within the base opposite the aperture, the waste container having an opening in communication with the drum such that the aperture is configured to fit flush against the opening when the drum is rotated.

2. The self-cleaning litter box of claim 1, wherein the waste container is removable from the base.

3. The self-cleaning litter box of claim 1, wherein a first edge of the filter screen is disposed at one end of the aperture.

4. The self-cleaning litter box of claim 1, wherein a protrusion is disposed on the base extending outwardly from the drum at a height consistent with a lower end of the aperture and configured to support an animal thereupon.

5. The self-cleaning litter box of claim 1, wherein a flat handle protruding outward is disposed on each annular side of the drum.

6. The self-cleaning litter box of claim 5, wherein an additional handle protruding outward is disposed on each annular side of the drum, wherein the additional handle is configured to prevent counter-clockwise rotation of the drum when the additional handle contacts a flange defined by a portion of the protrusion that extends to the sidewalls of the base.

7. The self-cleaning litter box of claim 1, wherein a motor that is operably connected to the drum is disposed in the base and configured to rotate the drum.

* * * * *